United States Patent [19]
Hanchett

[11] 3,932,840
[45] Jan. 13, 1976

[54] ERROR DETECTION AND SEQUENCE MAINTAINING SYSTEM FOR BAR-CODE READERS

[75] Inventor: Leland J. Hanchett, Winchester, Mass.

[73] Assignee: Taplin Business Machines Incorporated, Burlington, Mass.

[22] Filed: Dec. 5, 1974

[21] Appl. No.: 529,646

Related U.S. Application Data

[63] Continuation of Ser. No. 406,518, Oct. 15, 1973, abandoned.

[52] U.S. Cl. .................. 340/146.3 Z; 235/61.11 E
[51] Int. Cl.² .................................. G06K 5/00
[58] Field of Search ............... 340/146.3 Z, 146.3 H, 146.3 A, 340/146.3 C; 235/61.11 E

[56] References Cited
UNITED STATES PATENTS
3,309,667  3/1967  Feissel et al. ............... 340/146.3 Z

*Primary Examiner*—Leo H. Boudreau
*Attorney, Agent, or Firm*—Erwin Salzer

[57] ABSTRACT

A system for reading bar codes having characters formed by a plurality of bars and inter-bar spaces wherein each bar and each inter-bar space of a character signifies a bit of information is provided with means for detecting too many or too few single bar signals in a quantized character signal and for detecting and correcting sequence errors.

6 Claims, 6 Drawing Figures

ERROR DETECTION AND SEQUENCE MAINTAINING SYSTEM FOR BAR-CODE READERS

This is a continuation, of application Ser. No. 406,518, filed Oct. 15, 1973, now abandoned.

BACKGROUND OF THE INVENTION

The patent application of John F. Taplin, filed June 23, 1973, Ser. No. 265,637 for PRINTING AND PROCESSING INFORMATION IN BINARY FORM, now U.S. Pat. No. 3,896,917, discloses means for printing information in form of bars of equal height and variable width and inter-bar spaces of variable width wherein each bar and each inter-bar space signifies a bit of information. The patent application of Leland J. Hanchett, filed Sept. 17, 1973 Ser. No. 398,035 for BAR CODE PROCESSING AND DETECTING SYSTEM, now U.S. Pat. No. 3,900,832, discloses in a general way a system for processing bar coded information of the kind disclosed in the above patent application of John P. Taplin. This invention is more particularly concerned with the stage in the above patent application of Leland J. Hanchett intended for error detection and sequence check. This stage precedes the code conversion stage in the system which is disclosed in the above patent application of Leland J. Hanchett.

The most important code to be processed is one wherein each character is made up of four bars of equal height and three inter-bar spaces, and wherein each of the bars may have one of two possible widths, and each of the inter-bar spaces may have one of two possible widths, so that 128 different combinations may be formed of the four bars and the three inter-bar spaces of which each character is constituted.

While the present invention is not limited to error detection and sequence checking of information which is coded in the aforementioned manner, it is particularly useful in connection with processing information which is coded in that way and the processing of information which is coded in this fashion will be considered below with particularity.

SUMMARY OF THE INVENTION

A system embodying this invention comprises means for establishing bar edge signals including a bar signal differentiator, and a bar edge counter supplied with said bar edge signals. Such a system further comprises a first logic gate having a first input of said bar edge signals and a second input formed by a predetermined count of said bar edge counter and producing an output signal indicative of too many bars. Systems embodying this invention further include a clock-controlled character interval counter and a second logic gate having a first input formed by a predetermined count of said bar edge counter and a second input formed by a predetermined count of said character interval counter and producing an output signal indicative of too few bars. Systems embodying this invention further include a third logic gate having a first input of bar edge signals and a second input of bar signals, and a third input being the first bar edge count of said bar edge counter to produce an output signal indicative of a sequence error.

DESCRIPTION OF PREFERRED EMBODIMENT

Figures 1, 2:
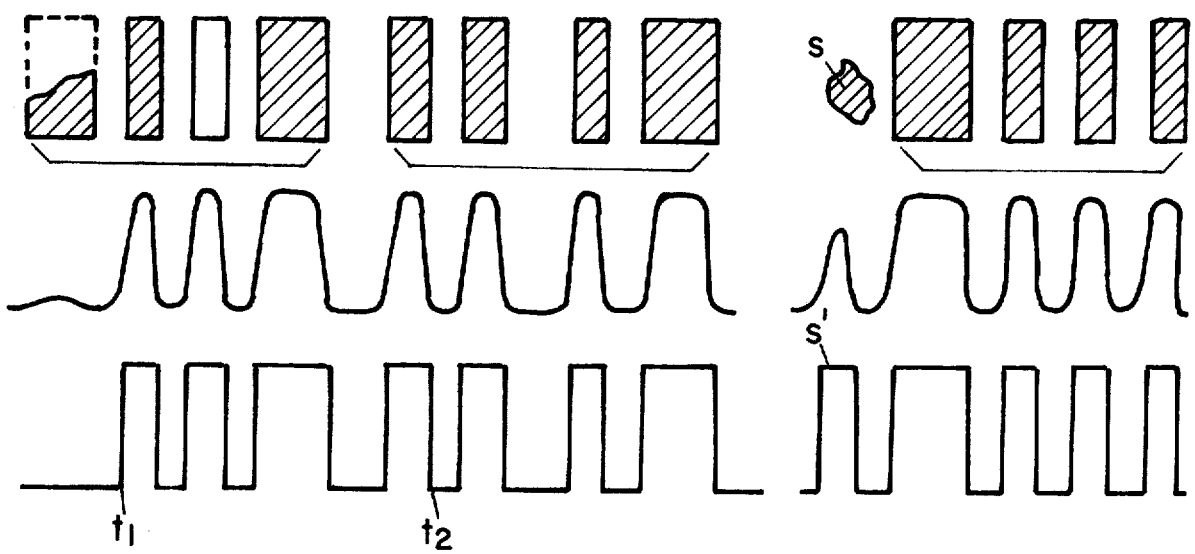
FIG. 1 illustrates an error which may occur on account of a printing defect in quantizing a bar code character.
FIG. 2 illustrates another error which may be caused by the same reasons.

Referring now to the drawings, and more particularly to FIG. 1 thereof, that figure includes three superimposed levels. The top level shows two bar coded characters of which each is made up of four bars and three inter-bar spaces. The first character includes two wide bars, two narrow bars, and three narrow inter-bar spaces. The second character includes three narrow bars, one wide bar, two narrow inter-bar spaces, and one wide inter-bar space. Brackets drawn in FIG. 1 indicate the constituents of each of the two characters or bar sets shown therein. FIG. 1 indicates diagrammatically that the first bar of the left bar set - which is a wide bar - has been mutilated, or not been properly printed. The second level of FIG. 1 from the top shows the electric analog signal resulting from scanning, or optically reading, the two characters shown on the top level of FIG. 1. All analog signals have the same amplitude, except the first analog signal resulting from reading of the mutilated bar of the first character seen from the left. The signal amplitude of the mutilated bar is much less than the signal amplitudes of the non-mutilated bars. The bottom level of FIG. 1 shows the same signal as shown at the intermediate level upon quantizing thereof. Quantizing may be effected by the quantizing circuitry disclosed in the above referred-to patent application of Leland J. Hanchett, or by any other well known quantizing circuitry. By whatever means quantizing is effected, the first mutilated wide bar of the first character will not produce any corresponding quantized signal. This is a defect which ought to be detected.

Referring now to FIG. 2, including three levels corresponding to the three levels of FIG. 1, the uppermost level of FIG. 2 shows a four bar character the constituent bars and inter-bar spaces of which have been bracketed. The character includes a wide bar, three narrow bars, and three narrow inter-bar spaces. To the left of the wide bar there is a spot, or smudge, not forming part of the following character. Spot s, when read, results in an amplitude not quite as high as that resulting from reading of a normal code bar, but sufficiently high to result in a spurious bar signal s' when the train of analog pulses has been quantized, or converted into digital pulses. This is another defect which ought to be detected.

In FIG. 1 the time of the leading edge of the first quantized bar pulse has been marked $t_1$ and the time of the trailing edge of the fourth bar signal has been marked $t_2$. The interval of time between $t_2$ and $t_1$ may be made a criterion for error detection. To be more specific, if this interval of time exceeds a critical duration this fact may be used as a criterion for an error signal.

In a like fashion the error illustrated in FIG. 2 may be detected by applying the criterion that there are too many bars within a predetermined period of time.

Figure 3:
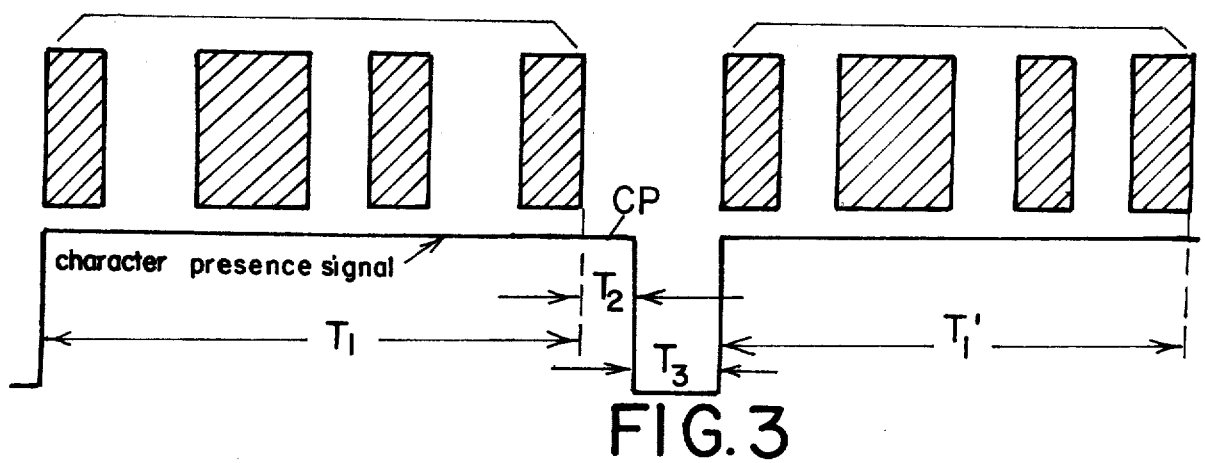
FIG. 3 shows two bar character sets each being formed of four bars and three inter-bar spaces and explains the concept of character presence signal as applied to the instant system.

FIG. 3 illustrates two consecutive bar coded characters of which each comprises four binary bars and three binary inter-bar gaps. The constituent parts of each character have been bracketed. The first character includes one wide bar, three narrow bars, two wide interbar spaces, and one narrow inter-bar space. The second character includes one wide bar, three narrow bars, and three narrow inter-bar spaces. The time elasping from the leading edge of the first bar of the first character to the trailing edge of the last bar thereof has been marked $T_1$ and the corresponding interval of time for the second character has been marked $T_1'$. The signal shown in FIG. 3 referred-to therein as characters presence signal CP is obtained by adding a fixed time $T_2$ to the times $T_1$ and $T_1'$, respectively. The reference character $T_3$ has been applied in FIG. 3 to indicate an interval of time during which the character presence signal CP is turned off. It is desirable to maximize the interval of time $T_3$ by turning off the character presence signal CP as soon as possible after character recognition. The interval of time $T_3$ may be referred-to as a time slot.

Figure 4:
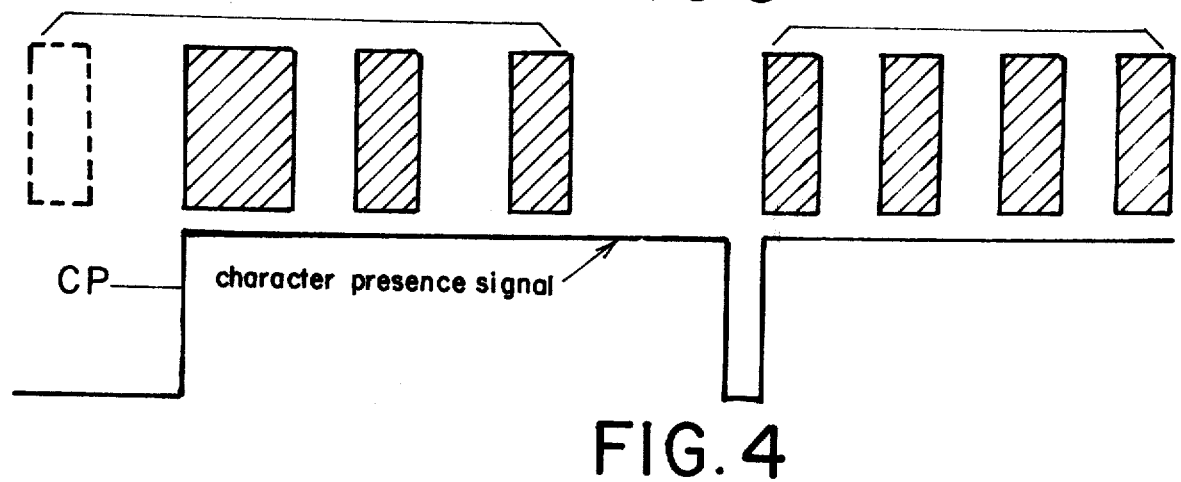
FIG. 4 illustrates the detection of a missing bar in a printed character.

Referring now to FIG. 4, the upper level of that figure shows two consecutive character sets each defined by a bracket. Each of the two character sets is made up of four bars and three inter-bar spaces. One of the bars of one of the bar sets, i.e. the bar to the left of the first bar set, is missing. Consequently the pulse in the quantized pulse train representing that bar will be also missing. As a result the duration of the character presence signal CP will be too long, and this may be used as a test or criterion for detection of an error.

The various quantities which determine presence or absence of an error are defined below in Boolean terms.

Definitions

| | |
|---|---|
| Bar signal | = a; |
| Space signal | = ā; |
| Bar edge signal | = b; |
| Bar edge count 1 | = c; |
| Last bar edge of character(in the instant case 8) | = d; |
| 8 | = d; |
| Character present | = e; |
| Character not present | = ē; |
| Character interval count $2^8(256)$ | = f; |
| Bar edge interval count $2^6 (64)$ | = j; |
| Bar edge interval count $2^5 (32)$ | = g; |
| Bar edge count $2^2(4)$ | = i; |
| Clock ($\phi$) | = k; |
| Not on page | = h; |

The invention is predicated on the presence of a flip-flop to the states of which all recognition operations are keyed. This flip-flop will hereinafter be referred-to as the character presence flip-flop. The first leading edge signal of a code bar sets the character presence signal. Normally the character presence flip-flop stays set during the period of time $T_1$ plus $T_2$, as explained in the context of FIG. 3. To be more specific, the character presence flip-flop normally stays set until a count of e.g. $2^5=32$ of the master clock following detection of the last bar edge of a character set, i.e. in the instant case the $2^3=8$th bar edge. Under certain error conditions the character presence flip-flop is reset prior to completion of reading of a character. These conditions are:

1. Detection of too wide a space following detection of a smaller number of bars than the number of bars pertaining to a character set having a fixed number of bars. Since in the code under consideration each character set has four bars, the character present flip-flop must be reset if too long a time interval follows a count of but two or but three bars.
2. The absence of enough bars to complete recognition of a character during a predetermined interval of time. In the instance under consideration there must be four bars to complete recognition of a character during a predetermined interval of time.

The condition of not being on the page with the scan should also preclude setting of the character presence flip-flop.

a. The condition of too many bars is defined by the Boolean term b.d (A bar egde occurs after 8 bar edges have been observed);
  b. The condition of too few bars is defined by the Boolean term f.d;
  c. The condition of sequence error is defined by the Boolean term a.c.b;
  d. The condition of the character presence flip-flop to set is defined by the Boolean term b.ē;
  e. The condition for the character presence flip-flop to reset is defined by the following Boolean term $k.d.g+f.d+i.j+h$.

Figure 5:
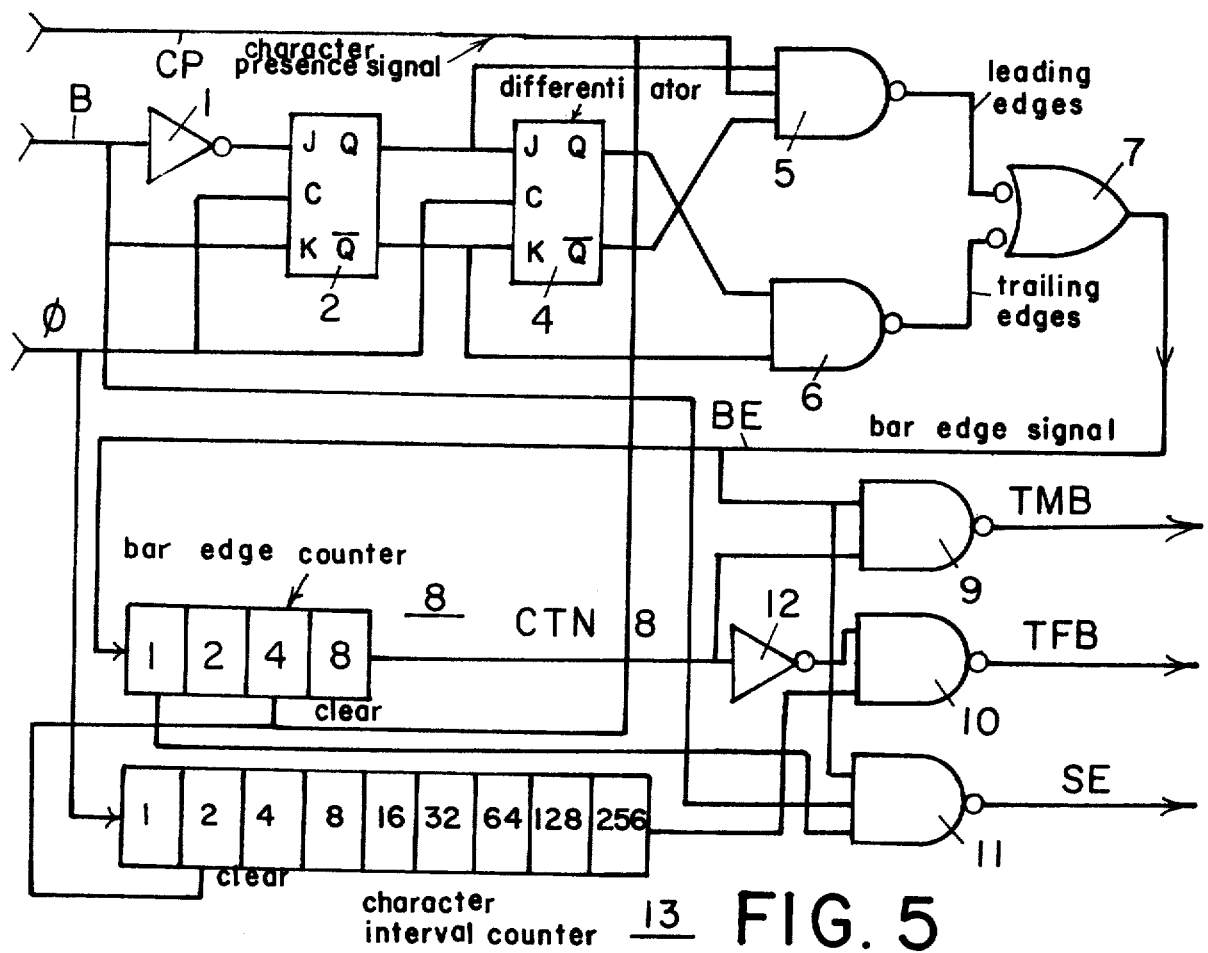
FIG. 5 is a logic circuit diagram for error detection.
Figure 6:
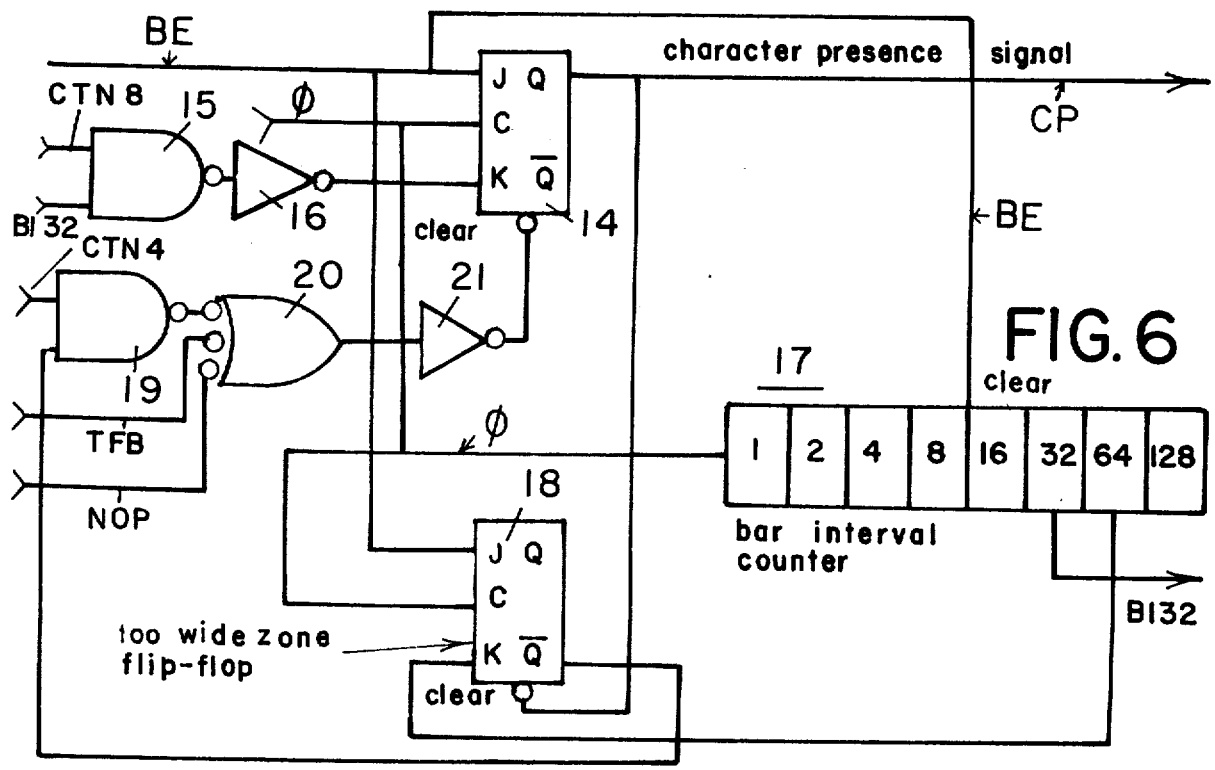
FIG. 6 is a logic circuit diagram supplementing that shown in FIG. 5 and showing the means for sequence maintenance.

Referring now to FIGS. 5 and 6 implementing the above, reference character B has been applied to indicate a channel carrying a quantized bar signal. That signal is inverted in inverter 1 and supplied to the J terminal of a J-K flip-flop 2. The non-inverted bar signal is supplied to the K terminal of flip-flop 2. The flip-flop 2 is synchronized and clocked by the clock signal O. The output of flip-flop 2 at its Q terminal is a train of rectangular pulses. These are supplied to the J terminal of a differentiator including the J-K flip-flop 4. Reference characters 5 and 6 have been applied to indicate a pair of NAND-gates of which the former is conductively connected to the Q terminal of flip-flop 4, and the latter is conductively connected to the O terminal of flip-flop 2. Other inputs of NAND-gate 5 are the character presence signal CP and the state of the Q terminal of flip-flop 4. The output of NAND-gate 5 are the bar leading edge signals prevailing during the character presence time $T_1$ plus $T_2$, as explained in the context of FIG. 3. How the character presence signal CP is generated will be explained below in connection with FIG. 6. The output of NAND-gate 6 are the bar trailing edge signals derived from the bar signal B. The OR-gate 7 combines the leading edge signal and the trailing edge signal, and its output is the bar edge signal BE which forms the input for the bar edge counter 8. Reference numerals 9, 10 and 11 have been applied to indicate three NAND-gates. The output of these NAND-gates are the too many bars signal TMB, the too few bars signal TFB, and the sequence error signal SE. These signals are formed in accordance with the Boolcan terms set forth above, as will be explained below in more detail. NAND-gate 9 has two inputs. One of them is the bar edge signal BE, and the other the bar edge count signal derived from bar edge counter 8. There are too many bars in the instant case if counter 8 has counted up to eight and NAND-gate 9 is still supplied with bar edge signals BE. NAND-gate 10 has two inputs. One is the inverted output of bar edge counter 8, and the other is the output character interval counter 13. The latter is achieved by the clock signals O counts up to $2^x=256$, and then transmits a signal to one of the inputs of NAND-gate 10. Both the bar edge counter 8 and the character interval counter are cleared in response to the condition or state of the signal CP. The NAND-gate 11 has three inputs of which one is the bar edge signal BE, one is the clock signal O, and one is the count 1 of bar edge counter 8.

Summarizing the above, the quantized bar signal is synchronized to a master clock (not shown) at the first flip-flop 2. The second or differentiator flip-flop provides edge signals for both the leading edges and the trailing edges of the bar signals. To ensure a valid start up on only a leading edge signal, the character presence signal inhibits all trailing edges until a leading edge is detected. Each bar edge signal is counted in bar edge counter 8 only during character presence time.

Referring now to FIG. 6, numeral 14 has been applied to indicate the above referred-to character presence flip-flop which generates the character presence signal CP. This flip-flop 14 is a J-K flip-flop, its J terminal being connected to a line carrying the bar edge signal BE which is the output signal of gate 7 shown in FIG. 6. Reference character O has been applied in FIG. 6 to indicate an input line for flip-flop 14 carrying the clock signal O. 15 is a NAND-gate having two inputs and 16 is an inverter for inverting the output of gate 15. NAND-gate 15 has two inputs. One input CTN8 is the output signal derived from bar edge counter 8 of FIG. 5 when completing its count up to 8, i.e. to the last of eight edges. The other input is BI 32 derived from bar interval counter 17 when completing its count to 32. The inverted output of NAND-gate 15 forms the K input of character presence flip-flop 14. Reference numeral 18 has been applied to indicate a flip-flop for generating a signal indicative of a too wide bar space which may be referred to as too wide zone flip-flop. The J terminal of flip-flop 18 is supplied with the bar edge signal BE and flip-flop 18 is under the control of clock signal O. The K terminal of flip-flop 18 is connected to the $2^6 = 64$ output of bar interval counter 7. The too wide bar space signal of flip-flop 18 is derived from its Q terminal and forms one of the inputs of NAND-gate 19. The other input CTN4 of gate 19 is derived from bar edge counter 8 when reaching the count of 4. Reference numeral 20 has been applied to indicate an OR-gate having three inputs. The output of OR-gate 20 when inverted by inverter 21 clears, or resets, character presence flip-flop 14. The output of NAND-gate 19, OR-gate 20 and inverter 21 causes clearing or reset of character presence flip-flop 14. This occurs in response to detection of too wide a space following an incomplete number of bars, i.e. less than four bars. The second input TFB of OR-gate 20 is the output of NAND-gate 10 shown in FIG. 5 occurring when there are too few bars in a character set. OR-gate 20 may have a third input which is a not on page signal NOP.

The state of character presence flip-flop 14 is the key for all character recognition operations.

Summarizing the above, character presence flip-flop 14 is set by the first leading edge signal of a bar set and normally remains in that state until a count of 32 master clocks following detection of the eighth bar edge of the bar set. The character presence flip-flop may under certin conditions be reset prior to completion of reading of a character or bar set. These conditions are (1) detection of too wide a space following less than four bars, or (2) presence of less than four bars to complete recognition of the character or bar set during a predetermined interval of time.

It will be apparent from the above that the quantized bar signal carried by line B is needed to generate bar edge signals BE and character presence signals CP. On the other hand, the character presence signal CP is used to reset the threshold signal channel necessary to obtain the quantized signal carried by line B as shown more in detail in the aforementioned copending patent application of Leland J. Hanchett for BAR CODE PROCESSING AND DETECTING SYSTEM. These conditions can be met by closed loop circuitry. In this way a stored threshold signal is maintained only during character presence time. Between characters the threshold is reset in preparation for the next character in the printed line.

I claim as my invention:

1. An error detection system for bar coded information wherein each character set is a member of a group made up of a predetermined number of bars and a predetermined number of inter-bar spaces of which each bar and each inter-bar space may have one of two different widths, said system comprising
   a. means for establishing bar edge signals including means for sensing bars in terms of electric bar signals and a bar signal differentiator;
   b. a bar edge counter supplied with said bar edge signals;
   c. a first logic gate having a first input formed by said bar edge signals and a second input formed by a predetermined count of said bar edge counter and producing an output signal indicative of too many bars;
   d. a clock-controlled character interval counter;
   e. a second logic gate having a first input formed by a predetermined count of said bar edge counter and a second input formed by a predetermined count of said character interval counter and producing as output a too few bars signal;
   f. a third logic gate having a first input formed by said bar signals, a second input formed by said bar edge signals and a third input formed by the first bar edge count of said bar edge counter to produce an output signal indicative of a sequence error;
   g. a bar interval counter;
   h. a fourth logic gate responsive to a predetermined count of said bar interval counter and to said predetermined count of said bar edge counter;
   i. a character presence flip-flop for producing a character presence signal connected to be set by said bar edge signal and to be reset by the output of said fourth logic gate; and
   j. additional means for resetting said character presence flip-flop including logic circuitry resetting said character presence flip-flop either in response to said too few bars signal or in response to coincidence of a count of said bar edge counter and a count of said bar interval counter.

2. A system as specified in claim 1 wherein said additional means for resetting said character presence flip-flop include an OR-gate having more than two inputs.

3. A system as specified in claim 1 including means for clearing said bar edge counter and means for clearing said character interval counter by said character presence signal.

4. In an error detection system for bar coded information wherein each character set is a member of a group made up of a predetermined number of bars and a predetermined number of interbar spaces of which each bar and each inter-bar space may have one of two different widths a circuitry for generating character presence signals including a. a master clock generating master clock signals;

b. a bar sensor generating bar signals and a differentiator supplied by said sensor and generating bar edge signals;

c. a clocked character presence flip-flop set by said bar edge signals;

d. means for counting said bar edge signals and means for resetting said character presence flip-flop upon a predetermined count of said bar edge signals and upon a predetermined count of said master clock signals; and e. additional means for resetting said character presence flip-flop, said additional means including logic circuitry for detection of a critically wide space following a number of bars smaller than said predetermined number of bars in a complete bar set, and said additional means further including logic circuitry for detection of the occurrence of a number of bars smaller than said number of bars in a complete bar set within a predetermined period of time.

5. A circuitry as specified in claim 4 including a. a J-K flip-flop generating character presence signals with its J input terminal connected to said bar edge signals carrying line;

b. a bar edge counter supplied with signals from said bar edge signals carrying line and a bar interval counter supplied with signals from said master clock signal carrying line, said bar edge counter being connected to be cleared by output signals derived from said character presence flip-flop and said bar interval counter being connected to be cleared by signals derived from said bar edge signals carrying line;

c. a first gate for combining counts of said bar edge counter and of said bar interval counter and having an output supplied to the K terminal of said character presence flip-flop;

d. a second gate for combining counts of said bar edge counter and signals indicative of too wide an interval between bars; and e. a third gate having at least two inputs, one of said inputs being the output of said second gate and said third gate being connected to clear said J-K flip-flop by the output signals thereof.

6. A circuitry as specified in claim 5 including an additional clocked J-K flip-flop connected with its J terminal to said bar edge signal carrying line, connected with its K terminal to said bar interval counter, connected with its Q terminal to one of the input terminals of second gate, and connected to be cleared by character presence signals forming the output of said J-K flip-flop.

* * * * *